United States Patent
Shi (10) Patent No.: US 10,685,208 B2
(45) Date of Patent: Jun. 16, 2020

(54) CONTROLLING METHOD AND ELECTRONIC DEVICE

(71) Applicant: Lenovo (Beijing) Co., Ltd., Beijing (CN)

(72) Inventor: Jun Shi, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 172 days.

(21) Appl. No.: 15/941,244

(22) Filed: Mar. 30, 2018

(65) Prior Publication Data

US 2018/0373920 A1    Dec. 27, 2018

(30) Foreign Application Priority Data

Jun. 26, 2017 (CN) .......................... 2017 1 0493759

(51) Int. Cl.
 *G06K 9/00* (2006.01)
 *G06F 3/044* (2006.01)

(52) U.S. Cl.
 CPC ....... *G06K 9/00087* (2013.01); *G06K 9/0002* (2013.01); *G06F 3/044* (2013.01)

(58) Field of Classification Search
 None
 See application file for complete search history.

(56) References Cited

U.S. PATENT DOCUMENTS

| 9,589,171 | B1* | 3/2017 | Larsson | G06K 9/0002 |
| 9,842,242 | B1* | 12/2017 | Larsson | G06K 9/00013 |
| 9,864,895 | B1* | 1/2018 | Larsson | G06K 9/0002 |
| 10,325,134 | B2* | 6/2019 | Andersson | G06K 9/209 |
| 2015/0071511 | A1* | 3/2015 | Wang | G06F 1/3231 |
| | | | | 382/124 |

FOREIGN PATENT DOCUMENTS

| CN | 106778616 A | 5/2017 |
| CN | 106815546 A | 6/2017 |

* cited by examiner

*Primary Examiner* — Nancy Bitar
(74) *Attorney, Agent, or Firm* — Anova Law Group, PLLC (57) ABSTRACT

A controlling method includes acquiring induction information of an operation body at a fingerprint collection region, determining, based on the induction information, a target collection region for collecting fingerprint corresponding to the operation body, and enabling sensors corresponding to the target collection region. The target collection region is a sub-region of the fingerprint collection region.

20 Claims, 9 Drawing Sheets

---

Acquiring induction information of an operation body at a fingerprint collection region — 101

Based on the induction information, determining a target collection region for collecting fingerprint corresponding to the operation body, where the target collection region belongs to the fingerprint collection region, i.e., the target collection region is a sub-region of the fingerprint collection region — 102

Enabling sensors corresponding to the target collection region, such that the identifying circuit performs identification based on the fingerprint information of the operation body at the target collection region — 103

CONTROLLING METHOD AND ELECTRONIC DEVICE

CROSS-REFERENCES TO RELATED APPLICATION

This application claims priority to Chinese Patent Application No. 201710493759.1, filed on Jun. 26, 2017, the entire contents of which are hereby incorporated by reference.

TECHNICAL FIELD

The present disclosure generally relates to the technical field of fingerprint detection and control and, more particularly, to a controlling method and an electronic device.

BACKGROUND

In existing capacitive fingerprint detection solutions, the requirements on the identification precision of the fingerprint are high. Therefore, a large number of channels are needed. For example, for a fingerprint identification region with a size of 8 mm*8 mm, the number of transmission (Tx) channels and the number of receiving (Rx) channels need to be around (160180) and (160180), respectively. If the size of the region requiring fingerprint identification increases or the entire screen requires fingerprint identification, the size of the chip for fingerprint identification needs to be increased. For example, if the size of the fingerprint collection region is increased to 24 mm*8 mm, the number of Tx channels needs to be around 160*3=480. Thus, the size of the chip for fingerprint identification needs to be 3 times of its original size. However, during a practical identification process, only around ⅓ of the fingerprint identification area may be utilized, leaving the rest ⅔ useless. Such design has a relatively low utilization rate.

BRIEF SUMMARY OF THE DISCLOSURE

One aspect of the present disclosure provides a controlling method. The method includes acquiring induction information of an operation body at a fingerprint collection region, determining, based on the induction information, a target collection region for collecting fingerprint corresponding to the operation body, and enabling sensors corresponding to the target collection region. The target collection region is a sub-region of the fingerprint collection region.

Another aspect of the present disclosure provides an electronic device. The electronic device includes a display screen, a plurality of sensors, and a fingerprint identifier. The display screen includes a display output region. The plurality of sensors form a fingerprint collection region and the fingerprint collection region overlaps with the display output region. The fingerprint identifier acquires induction information of an operation body at the fingerprint collection region. Based on the induction information, the fingerprint identifier determines a target collection region for collecting fingerprint corresponding to the operation body, where the target collection region is a sub-region of the fingerprint collection region. Further, the fingerprint identifier enables one or more of the sensors that correspond to the target collection region.

Other aspects of the present disclosure can be understood by those skilled in the art in light of the description, the claims, and the drawings of the present disclosure.

BRIEF DESCRIPTION OF THE DRAWINGS

In order to more clearly illustrate technical solutions in embodiments of the present disclosure, drawings for describing the embodiments are briefly introduced below. Obviously, the drawings described hereinafter are only some embodiments of the present disclosure, and it is possible for those ordinarily skilled in the art to derive other drawings from such drawings without creative effort.

DETAILED DESCRIPTION

Various solutions and features of the present disclosure will be described hereinafter with reference to the accompanying drawings. It should be understood that, various modifications may be made to the embodiments described below. Thus, the specification shall not be construed as limiting, but is to provide examples of the disclosed embodiments. Further, in the specification, descriptions of well-known structures and technologies are omitted to avoid obscuring concepts of the present disclosure.

The terminology used herein is for the purpose of describing specific embodiments and is not intended to be limiting of the present disclosure. As used herein, the singular forms "a," "an," and "the" are intended to include the plural forms as well, unless the context clearly indicates otherwise. Further, the terms "include," "including," "comprise," and "comprising" specify the present of the stated features, steps, operations, components and/or portions thereof, but do not exclude the possibility of the existence or adding one or more other features, steps, operations, components, and/or portions thereof.

As used herein, the term "and/or" includes any and all combinations of one or more of the associated listed items. Expression such as "at least one of" when preceding a list of elements may modify the entire list of elements and may not modify the individual elements of the list.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Some block diagrams and/or flowcharts are provided in the accompanying drawings. It is understood that some blocks of the block diagrams and/or flowcharts, and combinations of blocks in the block diagrams and/or flowcharts, can be implemented by computer program instructions. These computer program instructions may be provided to a processor of a general purpose computer, special purpose computer, or other programmable data processing apparatus, such that the instructions, when being executed by the processor, may create devices for implementing functions/operations specified in the block diagrams and/or flowcharts.

Figure 1:
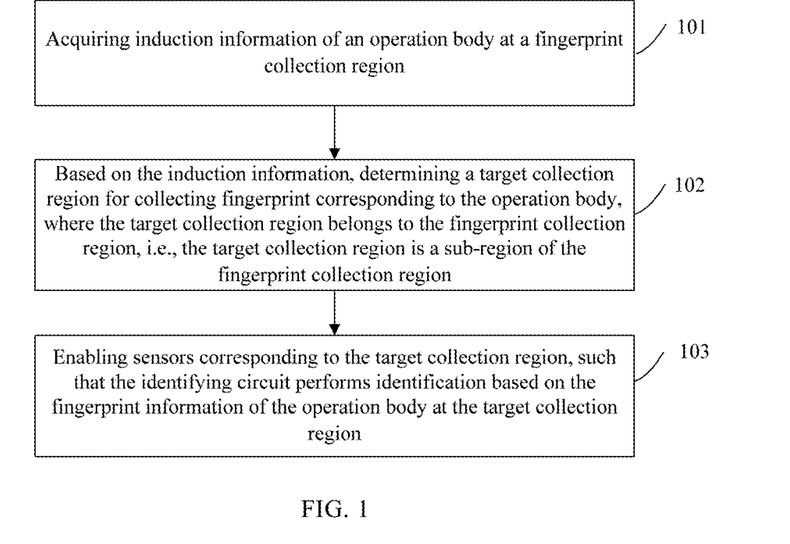
FIG. 1 illustrates a flowchart of an example of a controlling method in accordance with some embodiments of the present disclosure.

The present disclosure provides a controlling method, and the method may be applied to an electronic device. FIG. 1 illustrates a flowchart of an example of a controlling method in accordance with some embodiments of the present disclosure. As shown in FIG. 1, the controlling method includes acquiring induction information of an operation body at a fingerprint collection region (S101). The fingerprint collection region may also be referred to as fingerprint identification region.

The operation body may be, for example, a user of an electronic device that is able to input fingerprint at the fingerprint collection region of the electronic device. In some embodiments, the operation body may be a finger of the user. The fingerprint collection region may be located on a display screen of the electronic device, for example, the fingerprint collection region may cover entire or a portion of the display screen.

The fingerprint collection region may be formed by a plurality of sensors (e.g., a sensor array). In some embodiments, the fingerprint collection region may be divided into P fingerprint collection sub-regions, where P is a positive integer greater than or equal to 2. That is, the plurality of sensors may be divided into P sensor groups to respectively form the P fingerprint collection sub-regions.

The induction information may be configured to characterize the fingerprint input by the operation body at a certain region of the fingerprint collection region. Further, the induction information may be presented in various forms. For example, the induction information may be an electric signal such as a capacitance signal, or a voltage signal. The induction information may also be a force signal or a pressure signal.

In some embodiments, acquiring induction information of an operation body at a fingerprint collection region may include: receiving a first operation at the fingerprint collection region; acquiring first data information corresponding to the first operation; and, based on the first data information, generating the induction information.

The first data information may be configured to, for example, characterize operation property information corresponding to the first operation. The first operation may be an operation for inputting fingerprint at the fingerprint collection region, such as a pressing operation that inputs fingerprint at the fingerprint collection region.

For example, when the first operation is a long press at the fingerprint collection region, the first data information may include a touch area between the operation body and the fingerprint collection region, the force applied by the operation body on the fingerprint collection region, and a duration of the long press, etc.

Referring again to FIG. 1, the controlling method further includes, based on the induction information, determining a target collection region for collecting fingerprint corresponding to the operation body (S102). The target collection region belongs to the fingerprint collection region. That is, the target collection region may be a sub-region of the fingerprint collection region. In some embodiments, the fingerprint collection region may be divided into a plurality of fingerprint collection sub-regions, and based on the induction information, a target collection region and a fingerprint collection sub-region that the target collection region belongs to may be determined.

In some embodiments, in response to the induction information being a capacitance signal, determining, based on the induction information, a target collection region for collecting fingerprint corresponding to the operation body may include: when a triggering condition is satisfied, monitoring the capacitance signal; and determining an area of the fingerprint collection region where the capacitance signal changes as the target collection region.

For example, the triggering condition may be the detection of a need for an identifying circuit to perform fingerprint identification. The identifying circuit may be, for example, an integrated circuit or a fingerprint processing chip (also referred to as fingerprint identification chip) including a plurality of channels, such as Tx and/or Rx channels. The identifying circuit may further include switches corresponding to the plurality of channels.

In one embodiment, the triggering condition may be the detection of a need for the identifying circuit to perform fingerprint identification to unlock the electronic device. Further, a target collection region may be determined for subsequent fingerprint identification by the identifying circuit.

In another embodiment, the triggering condition may be detection of a payment interface that requires fingerprint identification and verification. For example, the payment interface may be popped up on a display screen of the electronic device, and the detection of the payment interface may indicate the triggering condition is satisfied.

The triggering condition may also be other conditions, and may be configured or adjusted based on actual situations. The present disclosure is not limited thereto.

In some embodiments, in response to the induction information being a force signal, determining, based on the induction information, a target collection region for collecting fingerprint corresponding to the operation body may include: when a triggering condition is satisfied, monitoring a force signal; and determining a force signal generation region of the fingerprint collection region as the target collection region.

The force signal generation region may refer to a region where a force signal is generated. Similarly, the triggering condition may be, for example, detection of a need for an identifying circuit to perform fingerprint identification. Further, the target collection region may be determined for subsequent fingerprint identification by the identifying circuit.

Referring again to FIG. 1, the controlling method further includes enabling sensors corresponding to the target collection region, thus allowing the identifying circuit to perform identification on the fingerprint information of the operation body acquired by the sensors within the target collection region (S103). The identifying circuit may be connected to a plurality of sensors corresponding to the fingerprint collection region via switches, and the switches may control the identifying circuit to be electrically connected to a part of sensors of the plurality of sensors.

The sensors that are electrically connected to the identifying circuit are known to be in an "enabled" state. In the "enabled" state, sensors may collect the fingerprint information of the operation body at the corresponding fingerprint collection region.

In some embodiments, enabling sensors corresponding to the target collection region may include: switching the switches to the sensors corresponding to the target collection region to enable the sensors corresponding to the target collection region. Switching the switches to the sensors corresponding to the target collection region may refer to switching the switches to electrically connect the identifying circuit to the sensors corresponding to the target collection region.

That is, the plurality of sensors corresponding to the fingerprint collection region may be conveniently controlled. When in the "enabled" state, the sensors corresponding to the target collection region may collect the fingerprint input by the operation body at the target collection region.

As such, because the identifying circuit identifies the fingerprint information collected from the target collection region, the target collection region is a sub-region of the fingerprint collection region. Further, because each time only a portion of the fingerprint collection region is used as the target collection region, one identifying circuit may support a large-scale fingerprint collection region. In other words, one identifying circuit may perform fingerprint identification on a fingerprint collection region with a large area. Thus, the utilization rate of the identifying circuit may be improved. Further, because one identifying circuit can support and cover a large-scale fingerprint collection region, multiple identifying circuits are not needed for the large-scale fingerprint collection region, which saves the hardware cost.

Further, when enabling sensors corresponding to the target collection region, the method may include: disabling sensors corresponding to sub-regions of the fingerprint collection region other than the target collection region. That is, only the sensors corresponding to the target collection region are enabled, and sensors corresponding to sub-regions of the fingerprint collection region other than the target collection region are disabled.

Thus, the identifying circuit may only perform fingerprint identification on the fingerprint information collected from the target collection region. Accordingly, malfunction of the identifying circuit when performing fingerprint identification caused by, for example, the sensors that correspond to regions of the fingerprint collection region other than the target collection region being in the "enabled" state, may be prevented.

In some embodiments, after the identifying circuit performs identification on the fingerprint information of the operation body at the target collection region, the method further includes: when a change in the target collection region is detected, switching, through a control switch, the identifying circuit from being electrically connected to the target collection region to being electrically connected to a different target collection region.

For example, the fingerprint collection region of a display screen may be divided into a first fingerprint collection sub-region and a second fingerprint collection sub-region. An identifying circuit may be electrically connected to the first fingerprint collection sub-region or the second fingerprint collection region via one or more switches. When a user presses the display screen, first induction information may be acquired from the first fingerprint collection sub-region, and a first target collection region that is within the first fingerprint collection sub-region may be determined based on the first induction information. Further, sensors corresponding to the first target collection region may be enabled, i.e., electrically connected to the identifying circuit, to allow the identifying circuit to perform identification on fingerprint information acquired by the first target collection region.

Further, the user may press again on the display screen, and second induction information may be acquired from the second fingerprint collection sub-region. A second target collection region that is within the second fingerprint collection sub-region may be determined based on the second induction information. In response to a change in the target collection region (i.e., changing from the first target collection sub-region changes to the second target collection sub-region), the identifying circuit may be switched from being electrically connected to the first target collection region to being electrically connected to the second, different, target collection region through the one or more switches. That is, sensors corresponding to the second target collection sub-region may be enabled, i.e., electrically connected to the identifying circuit, to allow the identifying circuit to perform identification on fingerprint information acquired by the second target collection region.

In some embodiments, the switches may be integrated into the identifying circuit. In some other embodiments, the switches may be integrated into an individual device that is connected to the identifying circuit, and the individual device may be connected to the fingerprint collection region.

Further, for example, for the fingerprint collection region that is divided into a number of fingerprint collection sub-regions, a plurality of switches may be integrated into an individual device that is connected to the identifying circuit, and the individual device may be connected to the fingerprint collection sub-regions.

For example, the identifying circuit may be connected with sensors corresponding to P fingerprint collection sub-regions, where P is a positive integer greater than or equal to 2. In some embodiments, connecting the identifying circuit with sensors corresponding to the P fingerprint collection sub-regions includes: connecting each channel of the identifying circuit with the P fingerprint collection sub-regions through a switch corresponding to the channel.

In some embodiments, connecting each channel of the identifying circuit with the P fingerprint collection sub-regions through a switch corresponding to the channel includes connecting an $i^{th}$ Tx channel of the identifying circuit with an $i^{th}$ Tx channel of one of the P fingerprint collection sub-regions through an $i^{th}$ switch and connecting a $j^{th}$ Rx channel of the identifying circuit with a $j^{th}$ Rx channel of one of the P fingerprint collection sub-regions through a $j^{th}$ switch, where i and j are positive integers, $1 \le i \le n$, $1 \le j \le m$, and n and m are the total number of Tx channels and the total number of Rx channels, respectively, included in the identifying circuit.

The disclosed controlling method may be applied to an electronic device having a fingerprint identifying function, and the electronic device may be, for example, a cellphone, a tablet, a notebook, and a TV. For example, the disclosed controlling method may be applied to an electronic device having a fingerprint identifying function that includes a full-size screen (i.e., the electronic device having the maximal screen-to-body ratio), and realize the full-screen fingerprint identification using the full-size screen (i.e., the fingerprint collection and identification can be performed at any position on the full-size screen).

Further, the fingerprint identification region of the full-size screen may be divided into a plurality of sub-regions, the specific sub-region in which the finger of the user is located is identified, and by switching the switch, only the sub-region that the finger touches is connected. Thus, the fingerprint processing chip only needs to be connected to one sub-region. For example, if there are 4 sub-regions and each sub-region includes four induction channels, the fingerprint processing chip only needs to correspondingly include four induction channels to drive four corresponding touch points. That is, there is no need to configure 16 induction channels in the fingerprint processing chip.

As such, the identifying circuit identifies the fingerprint information collected from the target collection region, where the target collection region is a sub-region of the fingerprint collection region. Further, because each time only a portion of the fingerprint collection region is used as the target collection region, one identifying circuit may support a large-scale fingerprint collection region. In other words, one identifying circuit may perform fingerprint identification on a fingerprint collection region with a large area. Thus, the utilization rate of the identifying circuit may be improved. Further, because one identifying circuit can support and cover a large-scale fingerprint collection region, multiple identifying circuits are not needed for the large-scale fingerprint collection region, which saves the hardware cost.

Figure 2:
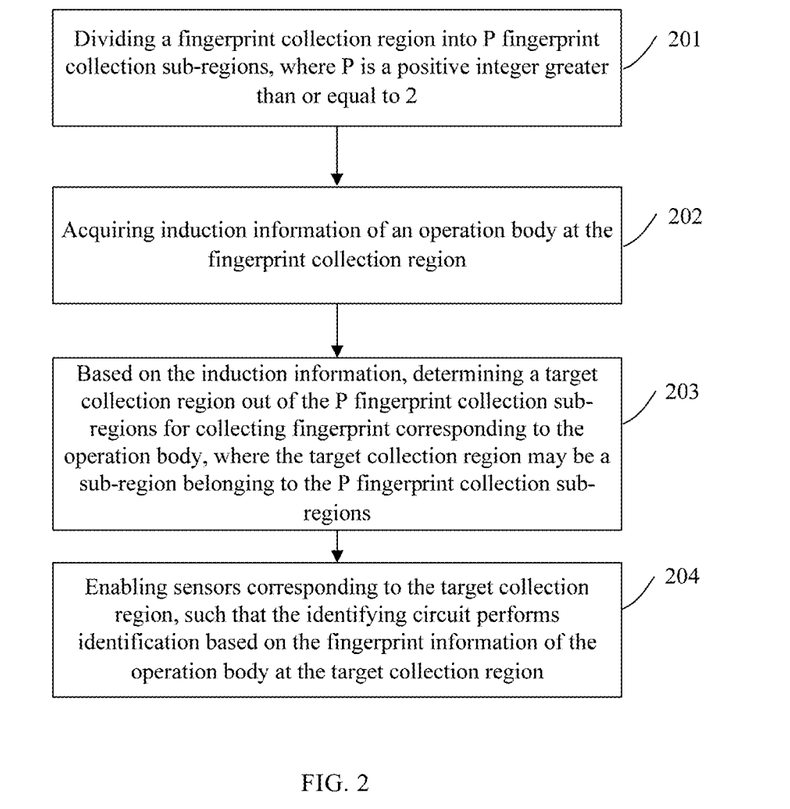
FIG. 2 illustrates a flowchart of another example of a controlling method in accordance with some embodiments of the present disclosure.

FIG. 2 illustrates a flowchart of another example of a controlling method applicable to an electronic device, in accordance with some embodiments of the present disclosure. As shown in FIG. 2, the method includes dividing a fingerprint collection region into P fingerprint collection sub-regions, where P is a positive integer greater than or equal to 2 (S201). The identifying circuit each time performs fingerprint identification on one of the P fingerprint collection sub-regions.

The value of P may be determined, for example, based on the maximal range that the identifying circuit covers when performing fingerprint identification. For example, an identifying circuit (e.g., with a size of 8 mm*8 mm) may each time identify a fingerprint collection region with a size of 8 mm*8 mm in a high-precision manner. Correspondingly, the area of each of the P fingerprint collection sub-regions needs to be smaller than or equal to 8 mm*8 mm. For example, if the area of the fingerprint collection region is approximately 24 mm*8 mm, the fingerprint collection region may be divided into three fingerprint collection sub-regions (i.e., P=3), and each of the three fingerprint collection sub-region may have an area of approximately 8 mm*8 mm.

Figure 3:
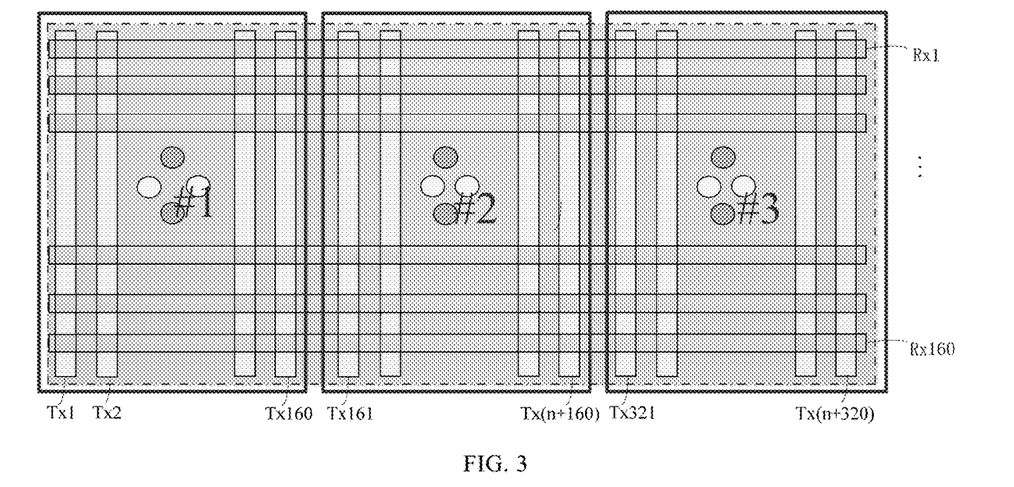
FIG. 3 illustrates a schematic view of an example showing a fingerprint collection region being divided into fingerprint collection sub-regions in accordance with some embodiments of the present disclosure.

FIG. 3 illustrates a schematic view of an example fingerprint collection region divided into three fingerprint collection sub-regions in accordance with some embodiments of the present disclosure. As shown in FIG. 3, a fingerprint collection region may be divided into three fingerprint collection sub-regions, denoted as #1, #2, and #3. The areas of the fingerprint collection sub-region #1, the fingerprint collection sub-region #2, and the fingerprint collection sub-region #3 may be the same.

Further, the number of Tx channels corresponding to each fingerprint collection sub-region may be equal to 160, and the number of Rx channels corresponding to each fingerprint collection sub-region may be equal to 160 (i.e., Rx1~RX160). For example, the Tx channels of the fingerprint collection sub-region #1 may be denoted as Tx1~Tx160, the Tx channels of the fingerprint collection sub-region #2 may be denoted as Tx161~Tx320, and the Tx channels of the fingerprint collection sub-region #3 may be denoted as Tx321~Tx480. The Tx channels Tx1~Tx480 may be arranged in parallel to each other, and the Rx channels Rx1~Rx160 may be arranged in parallel to each other. The Tx channels may be arranged, for example, perpendicular to the Rx channels.

Referring again to FIG. 2, the controlling method further includes acquiring induction information of an operation body within a fingerprint collection sub-region (S202).

The induction information may be configured to characterize that the operation body intends to input or has input fingerprint in a certain region of the fingerprint collection region. The induction information may be presented in various forms. For example, a capacitance signal may represent the induction information, or a voltage signal may represent the induction information.

The controlling method further includes: based on the induction information, determining a target collection region out of the P fingerprint collection sub-regions for collecting fingerprint of the operation body (S203). The target collection region may be one of the P fingerprint collection sub-regions.

In some embodiments, determining, based on the induction information, a target collection region out of the P fingerprint collection sub-regions for collecting fingerprint of the operation body includes following situations. In one situation, only one of the P fingerprint collection sub-regions has induction information, and the one fingerprint collection sub-region having the induction information is determined as the target collection region. In another situation, two or more of the P fingerprint collection sub-regions have the induction information, and a fingerprint collection sub-region having the strongest induction information is determined as the target collection region.

In one embodiment, if the induction information is a capacitance signal, then determining, based on the induction information, a target collection region out of the P fingerprint collection sub-regions for collecting fingerprint of the operation body includes: monitoring a capacitance signal; and determining a fingerprint collection sub-region where the capacitance signal changes as the target collection region out of the P fingerprint collection sub-regions.

In one embodiment, if the induction information is a force signal, then determining, based on the induction information, a target collection region out of the P fingerprint collection sub-regions for collecting fingerprint of the operation body includes: monitoring a force signal; and determining a fingerprint collection sub-region where the force signal is generated as the target collection region out of the P fingerprint collection sub-regions.

In one embodiment, the method may further include: configuring one detection circuit for each fingerprint collection sub-region of the P fingerprint collection sub-regions, and each detection circuit is configured to detect whether induction information is generated at a corresponding fingerprint collection sub-region.

For example, given the three fingerprint collection sub-regions shown in FIG. 3 as an example, a detection circuit 1 is configured for the fingerprint collection sub-region #1, a detection circuit 2 is configured for the fingerprint collection sub-region #2, and a detection circuit 3 is configured for the fingerprint collection sub-region #3. For example, the detection circuit 1, the detection circuit 2, and the detection circuit 3 may each include one or more sensors for detecting induction information generated in response to fingerprint input.

That is, the detection circuit 1 may be configured to detect whether the fingerprint collection sub-region #1 receives fingerprint input, the detection circuit 2 may be configured to detect whether the fingerprint collection sub-region #2 receives fingerprint input, and the detection circuit 3 may be configured to detect whether the fingerprint collection sub-region #3 receives fingerprint input.

The controlling method may further include: enabling sensors corresponding to the target collection region, thus allowing the identifying circuit to perform identification on the fingerprint information of the operation body acquired by the sensors of the target collection region (S204).

The identifying circuit may be connected to a plurality of sensors corresponding to the P of fingerprint collection sub-regions, respectively via one or more switches, and the switches may control a corresponding identifying circuit to be connected to a part of sensors among the plurality of sensors.

In some embodiments, each channel (e.g., Tx channel) of the identifying circuit may be connected to the P fingerprint collection sub-regions via a switch corresponding to the channel. The P fingerprint collection sub-regions may, for example, include a first fingerprint collection sub-region, a second fingerprint collection sub-region, . . . , and a $P^{th}$ fingerprint collection sub-region. For example, by switching a switch corresponding to a Tx channel of the identifying circuit, the Tx channel of the identifying circuit may be electrically connected to the first fingerprint collection sub-region, the second fingerprint collection sub-region, . . . , or the $P^{th}$ fingerprint collection sub-region.

Further, connecting each channel of the identifying circuit to the P fingerprint collection sub-regions via a switch corresponding to the channel may include connecting an $i^{th}$ Tx channel of the identifying circuit with an $i^{th}$ Tx channel of one of the P fingerprint collection sub-regions through an $i^{th}$ switch and connecting a $j^{th}$ Rx channel of the identifying circuit with a $j^t$ Rx channel of one of the P fingerprint collection sub-regions through a $j^{th}$ switch, where i and j are positive integers, $1 \leq i \leq n$, $1 \leq j \leq m$, and n and m are the total number of Tx channels and the total number of Rx channels, respectively, included in the identifying circuit.

In some embodiment, enabling sensors corresponding to the target collection region may include: switching switches to sensors corresponding to the target collection region to enable the sensors corresponding to the target collection region.

Figure 4:
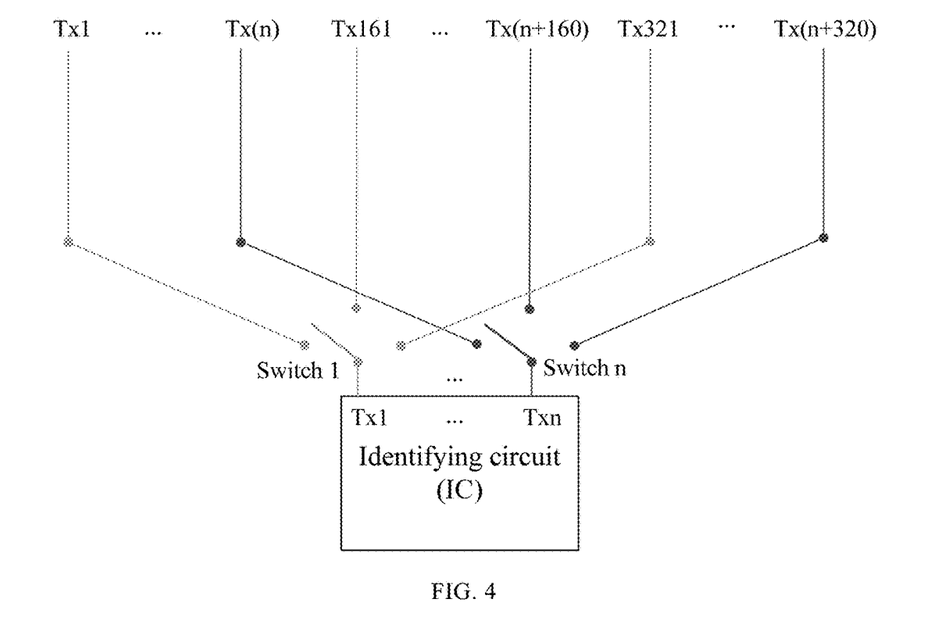
FIG. 4 illustrates a schematic view showing an example of an identifying circuit in controlling Tx channels corresponding to each fingerprint collection sub-region via a plurality of switches, in accordance with some embodiments of the present disclosure.

FIG. 4 illustrates a schematic view showing an example of an identifying circuit for controlling Tx channels corresponding to each fingerprint collection sub-region via a plurality of switches, in accordance with some embodiments of the present disclosure. As shown in FIG. 4, three fingerprint collection sub-regions may be configured, including Tx channels Tx1~Tx(n), Tx161~Tx(n+160), and Tx321~Tx(n+320), respectively, where n is a positive integer equal to or smaller than 160. Correspondingly, the identifying circuit may include n Tx channels, i.e., Tx1, Tx2, . . . , Txn. The n Tx channels may be connected to n switches. For example, the channel Tx1 of the identifying circuit may be connected to the switch 1, the channel Tx2 of the identifying circuit may be connected to the switch 2, and the channel Txn of the identifying circuit may be connected to the switch n.

Referring to both FIG. 3 and FIG. 4, via the switch 1, the channel Tx1 within the identifying circuit may be connected to the channel Tx1 corresponding to the first fingerprint collection sub-region (#1), to the channel Tx161 corresponding to the second fingerprint collection sub-region (#2), or to the channel Tx321 corresponding to the third fingerprint collection sub-region (#3). That is, the switch 1 may control the channels Tx1, Tx161, and Tx321 corresponding to the fingerprint collection sub-regions.

Further, when the switch 1 is connected to the channel Tx1 corresponding to the first fingerprint collection sub-region, the switch 1 may not be connected to the channel Tx161 corresponding to the second fingerprint collection sub-region nor the channel Tx321 corresponding to the third fingerprint collection sub-region.

Similarly, via the switch n, the channel Txn within the identifying circuit may be connected to the channel Txn corresponding to the first fingerprint collection sub-region (#1), to the channel Tx(n+160) corresponding to the second fingerprint collection sub-region (#2), or the channel Tx(n+320) corresponding to the third fingerprint collection sub-region (#3). That is, the switch n may control the channels Txn, Tx(n+160), and Tx(n+320) corresponding to the fingerprint collection sub-regions.

Further, when the switch n is connected to the channel Txn corresponding to the first fingerprint collection sub-region, the switch n may not be connected to the channel Tx(n+160) corresponding to the second fingerprint collection sub-region, nor to the channel Tx(n+320) corresponding to the third fingerprint collection sub-region.

Further, when the switch 1 is connected to the channel Tx1 corresponding to the first fingerprint collection sub-region, and switch n is connected to the channel Txn corresponding to the first fingerprint collection sub-region, the identifying circuit identifies the fingerprint information collected by the sensors corresponding to the first fingerprint collection sub-region. That is, when the switches 1~n are connected to the channels Tx1~Txn corresponding to the first fingerprint collection sub-region, respectively, the identifying circuit may identify the fingerprint information collected by the sensors corresponding to the first fingerprint collection sub-region.

Similarly, when the switches 1~n are connected to the channels Tx161~Tx(n+160) corresponding to the second fingerprint collection sub-region, respectively, the identifying circuit may identify the fingerprint information collected by the sensors corresponding to the second fingerprint collection sub-region. When the switches 1~n are connected to the channels Tx321~Tx(n+320) corresponding to the third fingerprint collection sub-region, respectively, the identifying circuit may identify the fingerprint information collected by the sensors corresponding to the third fingerprint collection sub-region.

In practical applications, to facilitate the identifying circuit to determine which fingerprint identification sub-region receives fingerprint input, a plurality of detection channels may be further configured. When the plurality of detection channels are activated (in the "activated" state), the induction information may be detected. Through the induction information, the specific fingerprint identification sub-region receiving the fingerprint input may be determined, and, through switches connected to the identifying circuit, the channels of the determined fingerprint collection sub-region may be connected to the identifying circuit.

The detection channels may be configured to be activated if certain condition(s) are satisfied. That is, the detection channel is not always in the activated state because some operations, such as a common sliding operation, do not require fingerprint identification. When fingerprint identification is needed, for example, when fingerprint input is required to unlock the electronic device or fingerprint input is required to decode a file or login into an application program, the detection channels need to be activated.

For example, when the identifying circuit is only responsible for the fingerprint collection region with a pre-configured area such as 8 mm*8 mm, no detection channel is needed. The detection channels are added, for example, when the area of the fingerprint collection region that the identifying circuit is responsible for is several times of the pre-configured area (e.g., 24 mm*8 mm). Under such situation, which fingerprint collection sub-region receives fingerprint input needs to be identified or differentiated.

Figure 5:
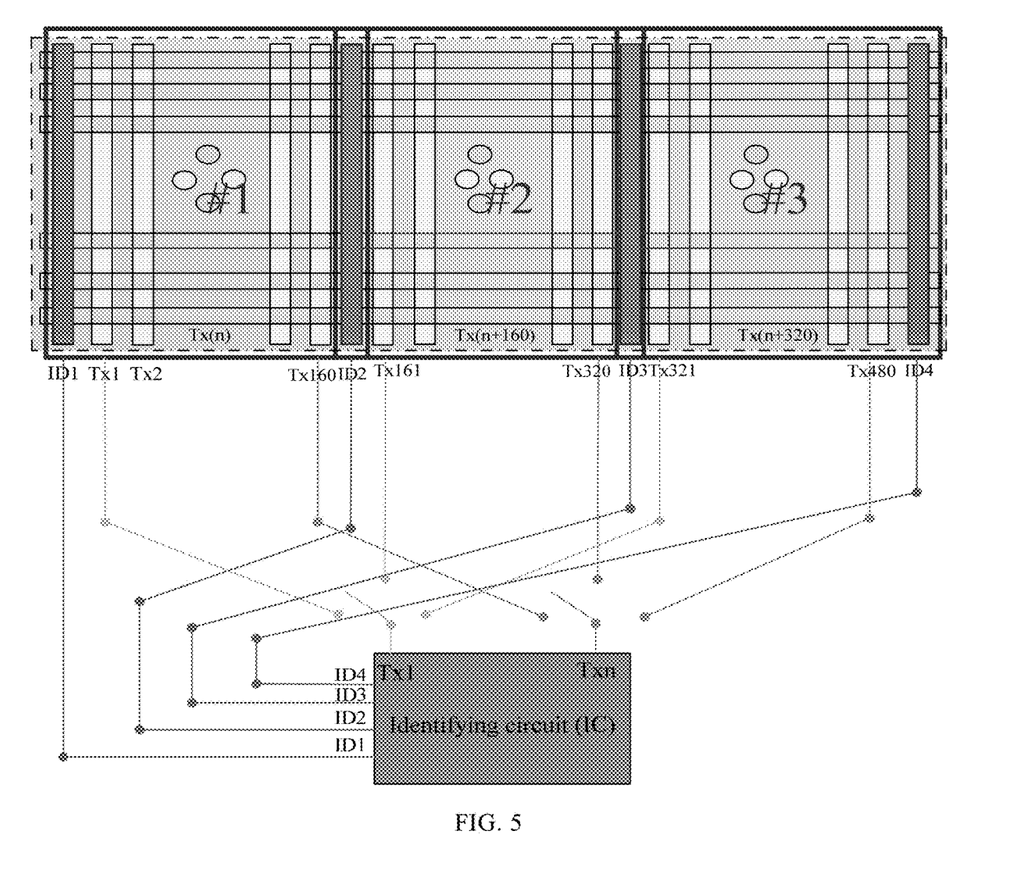
FIG. 5 illustrates a schematic view showing status of switches of an identifying circuit under a situation in which detection channels ID1-ID4 are activated and three fingerprint collection sub-regions receive no fingerprint input, in accordance with some embodiments of the present disclosure.

FIG. 5 illustrates a schematic view showing status of switches of an identifying circuit under a situation in which detection channels ID1-ID4 are activated and three fingerprint collection sub-regions receive no fingerprint input, in accordance with some embodiments of the present disclosure. Referring to FIG. 3 and FIG. 5, four detection channels denoted as ID1, ID2, ID3, and ID4, respectively, are configured for the three fingerprint collection sub-regions.

The detection channel ID1 is located to the left of the first fingerprint collection sub-region (#1), the detection channel ID2 may be located to the left of the second fingerprint collection sub-region (#2) and to the right of the first fingerprint collection sub-region (#1), the detection channel ID3 is located to the left of the third fingerprint collection sub-region (#3) and to the right of the second fingerprint collection sub-region (#2), and the detection channel ID4 is located to the right of the third fingerprint collection sub-region (#4).

In other words, the channels Tx1~Tx160 are disposed between the detection channel ID1 and the detection channel ID2, the channels Tx161~Tx320 are disposed between the detection channel ID2 and the detection channel ID3, and the channels Tx321~Tx480 are disposed between the detection channel ID3 and the detection channel ID4.

Further, the detection channels ID1-ID4 are connected to the identifying circuit, and similarly, the identifying circuit includes channels Tx1~Txn for connecting to the Tx channels corresponding to the fingerprint collection region via n switches. In one embodiment, as shown in FIG. 5, when none of the detection channels ID1-ID4 detects the induction information, the switches of the identifying circuit may be disconnected. That is, the identifying circuit may be disconnected from the Tx channels of any fingerprint collection sub-regions.

Figure 6:
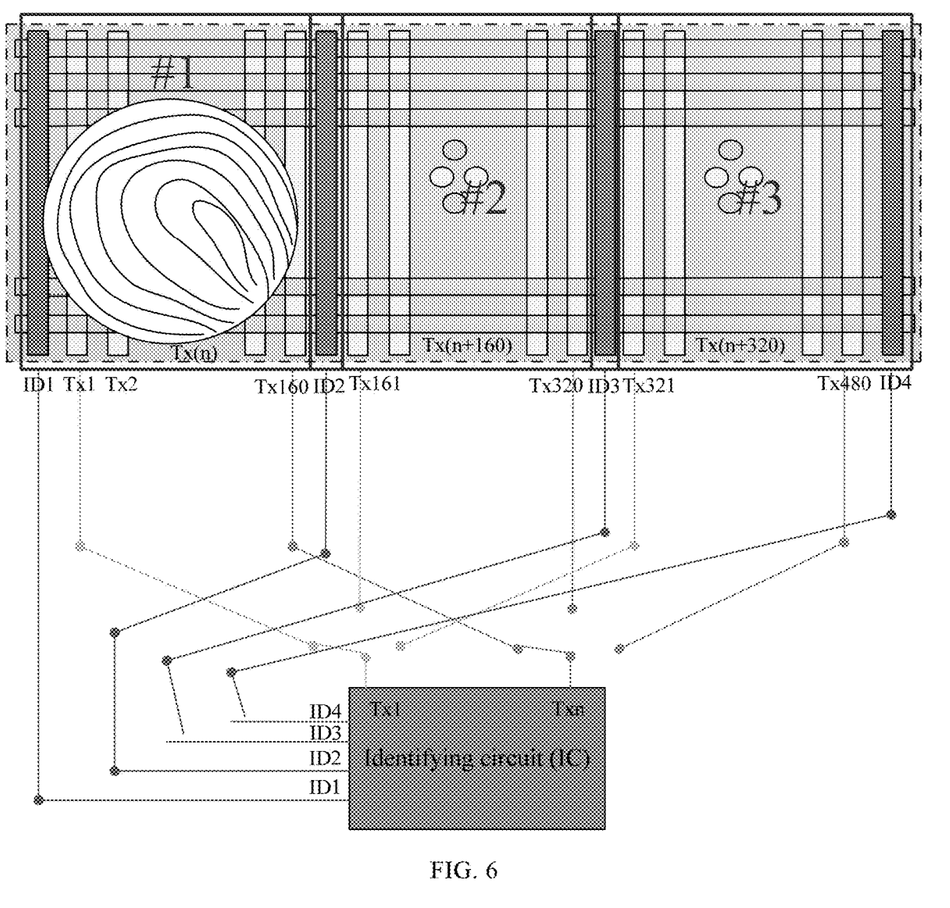
FIG. 6 illustrates a schematic view showing status of switches of an identifying circuit under a situation in which detection channels ID1-ID4 are activated and a first fingerprint collection sub-region receives fingerprint input, in accordance with some embodiments of the present disclosure.

FIG. 6 illustrates a schematic view showing status of switches of an identifying circuit under a situation in which detection channels ID1-ID4 are activated and a first fingerprint collection sub-region receives fingerprint input, in accordance with some embodiments of the present disclosure. As shown in FIG. 6, if a finger is put on the first fingerprint collection sub-region, the channel ID1 and the channel ID2 may identify a change in the capacitance, and the switches of the identifying circuit may be switched to the channels Tx1~Tx160 corresponding to the first fingerprint collection sub-region.

For example, the channels Tx1~Txn of the identifying circuit may be connected to the channels Tx1~Txn corresponding to the first fingerprint sub-region, thus enabling the sensors corresponding to the first fingerprint sub-region. Further, the identifying circuit may identify the fingerprint information collected by the sensors corresponding to the first fingerprint collection sub-region.

Figure 7:
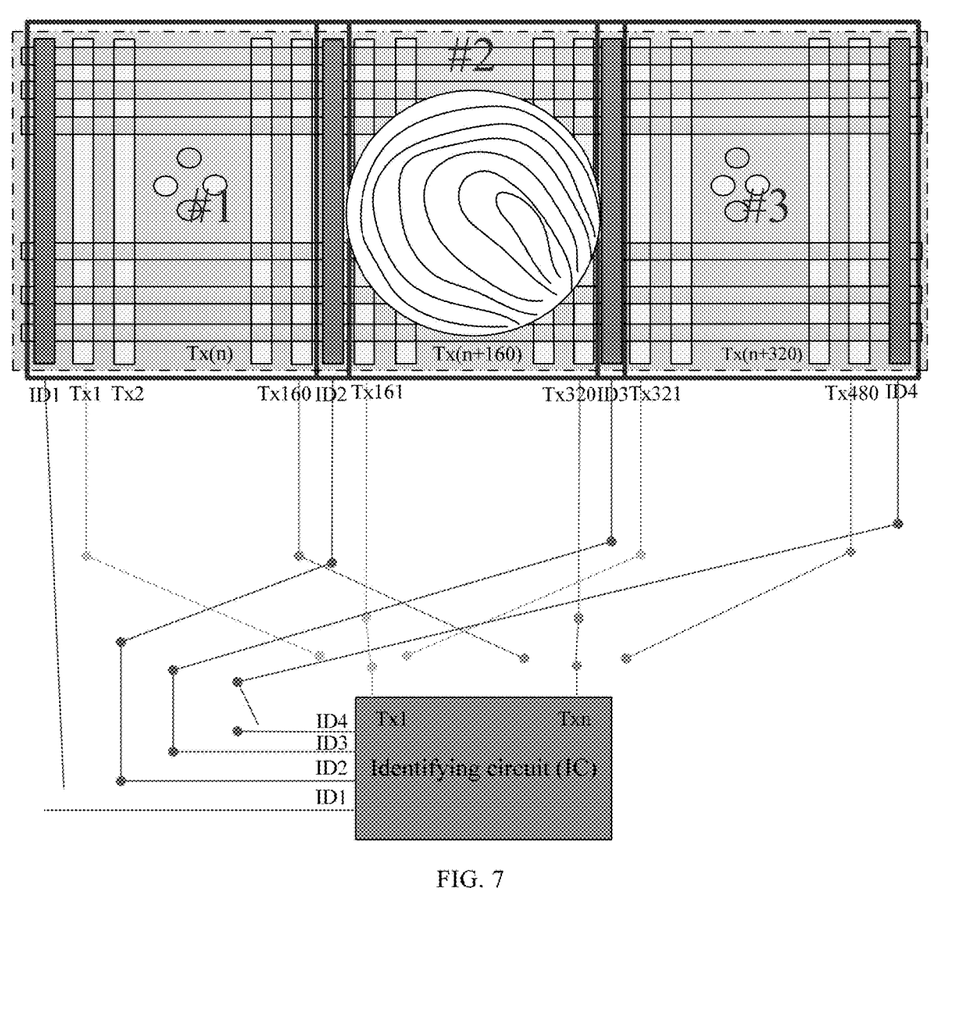
FIG. 7 illustrates a schematic view showing status of switches of an identifying circuit under a situation in which detection channels ID1-ID4 are activated and a second fingerprint collection sub-region receives fingerprint input, in accordance with some embodiments of the present disclosure.

FIG. 7 illustrates a schematic view showing status of switches of an identifying circuit under a situation in which detection channels ID1-ID4 are activated and a second fingerprint collection sub-region receives fingerprint input, in accordance with some embodiments of the present disclosure. As shown in FIG. 7, if a finger is put on the second fingerprint collection sub-region (#2), the channel ID2 and the channel ID3 may identify a change in the capacitance, and the switches of the identifying circuit may be switched to the channels Tx161~Tx320 corresponding to the second fingerprint collection sub-region.

For example, the channels Tx1~Txn of the identifying circuit may be connected to the channels Tx161~Tx(n+160) corresponding to the second fingerprint sub-region, thus enabling the sensors corresponding to the second fingerprint collection sub-region. Further, the identifying circuit may identify the fingerprint information collected by the sensors corresponding to the second fingerprint collection sub-region.

Figure 8:
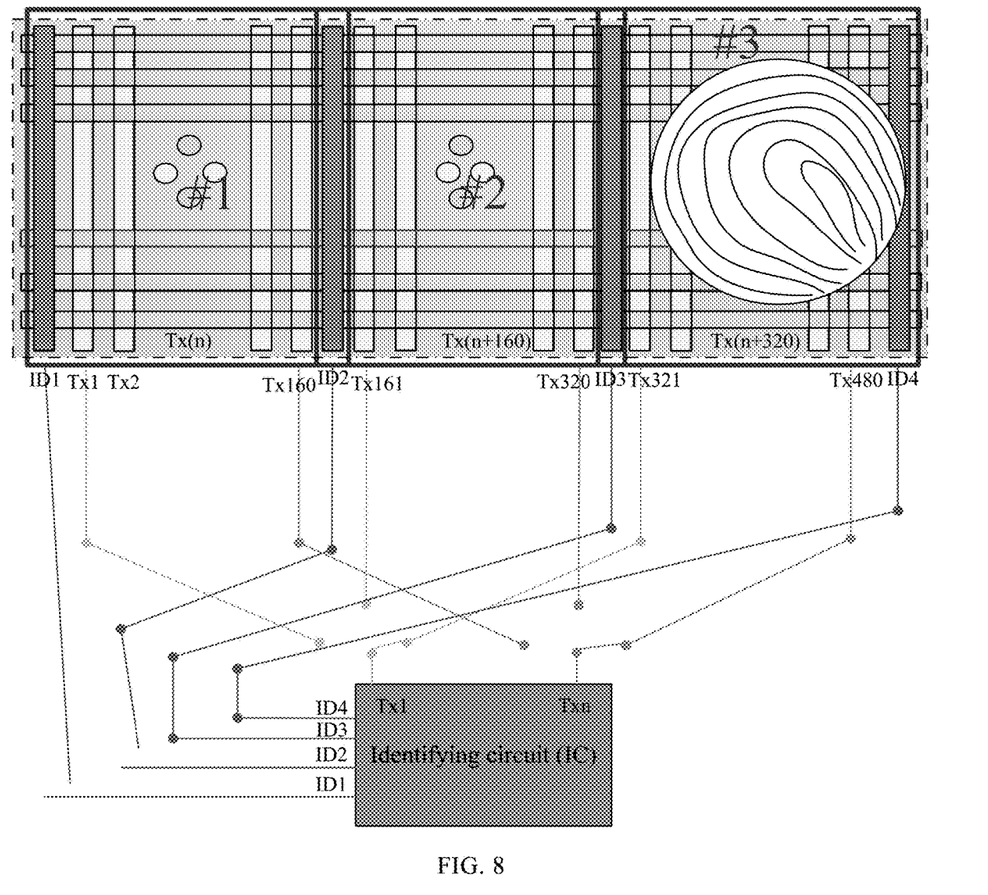
FIG. 8 illustrates a schematic view showing status of switches of an identifying circuit under a situation in which detection channels ID1-ID4 are activated and a third fingerprint collection sub-region receives fingerprint input, in accordance with some embodiments of the present disclosure.

FIG. 8 illustrates a schematic view showing status of switches of an identifying circuit under a situation in which detection channels ID1-ID4 are activated and a third fingerprint collection sub-region receives fingerprint input, in accordance with some embodiments of the present disclosure. As shown in FIG. 8, if a finger is put on the third fingerprint collection sub-region (#3), the channel ID3 and the channel ID4 may identify a change in the capacitance, and the switch of the identifying circuit may be switched to the channels Tx321~Tx480 corresponding to the third fingerprint collection sub-region.

For example, the channels Tx1~Txn of the identifying circuit may be connected to the channels Tx321~Tx(n+320) corresponding to the third fingerprint sub-region, thus enabling the sensors corresponding to the third fingerprint sub-region. Further, the identifying circuit may identify the fingerprint information collected by the sensor corresponding to the third fingerprint collection sub-region.

The aforementioned FIG. 3~FIG. 8 are based on Tx channel for illustrations, and the same or similar technical solutions are also suitable for Rx channels, and descriptions thereof are not provided herein.

The disclosed controlling method may be applied to an electronic device having a fingerprint identifying function, and the electronic device may be, for example, a cellphone, a tablet, a notebook, and a TV.

As such, the identifying circuit identifies the fingerprint information collected from the target collection region, where the target collection region is a sub-region of the fingerprint collection region. Further, because each time only a portion of the fingerprint collection region is used as the target collection region, one identifying circuit may support a large-scale fingerprint collection region. In other words, one identifying circuit may perform fingerprint identification on a fingerprint collection region with a large area. Thus, the utilization rate of the identifying circuit may be improved. Further, because one identifying circuit can support and cover a large-scale fingerprint collection region, multiple identifying circuits are not needed for the large-scale fingerprint collection region, which saves the hardware cost.

For example, an identifying circuit with a size of 8 mm*8 mm may each time identify a fingerprint collection region with a size of 8 mm*8 mm in a high-precision manner. The fingerprint collection region of an electronic device may be divided into P fingerprint collection sub-regions, and each fingerprint collection sub-region may have an area of 8 mm*8 mm. Because the identifying circuit each time identifies the fingerprint information collected from the target collection region, the disclosed identifying circuit with a size of 8 mm*8 mm may thus support a fingerprint collection region with a size up to P*8 mm*8 mm.

Figure 9:
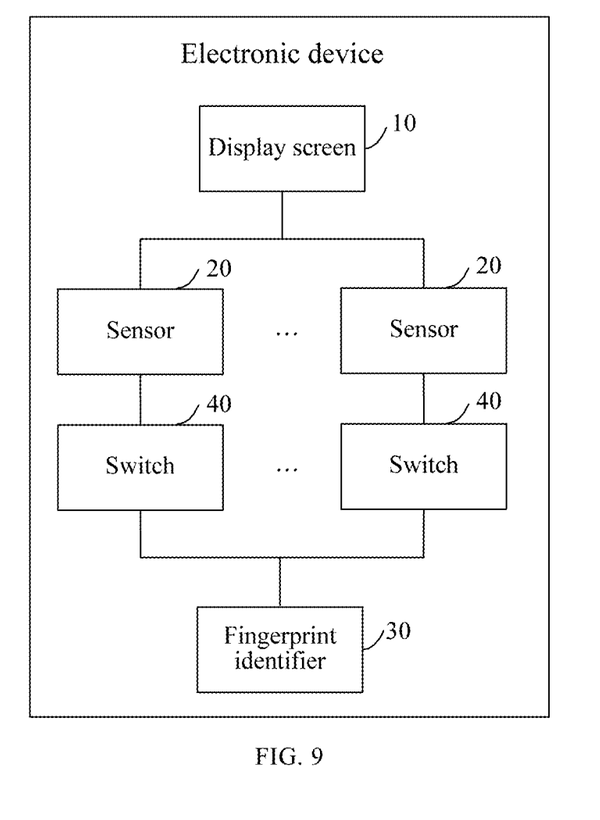
FIG. 9 illustrates a structural schematic view showing an example of an electronic device in accordance with some embodiments of the present disclosure.

The present disclosure further provides an electronic device. FIG. 9 illustrates a structural schematic view showing an example of an electronic device in accordance with some embodiments of the present disclosure. As shown in FIG. 9, the electronic device includes a display screen 10, a plurality of sensors 20, a fingerprint identifier 30, and a plurality of switches 40.

The display screen 10 may include a display output region. The plurality of sensors 20 may form a fingerprint collection region, and the fingerprint collection region may overlap with the display output region. The fingerprint identifier 30 may be configured to: acquire induction information of an operation body at the fingerprint collection region; and based on the induction information, determine a target collection region for performing fingerprint collection on the operation body. The fingerprint identifier 30 may further enable the sensors 20 corresponding to the target collection region, thereby performing identification on the fingerprint information of the operation body acquired by the sensors 20 of the target collection region. The target collection region herein belongs to the fingerprint collection region. That is, the target collection region is a sub-region of the fingerprint collection region.

The sensors 20 may be configured on an inner surface of a glass cover of the display screen 10, and the sensors 20 may be invisible from an external surface of the glass cover. The switches 40 may be disposed between the fingerprint identifier 30 and the sensors 20.

In some embodiments, the fingerprint identifier 30 may be further configured to: disable the sensors corresponding to regions of the fingerprint collection region other than the target collection region. That is, only the sensors corresponding to the target collection region are enabled, and sensors corresponding to regions of the fingerprint collection region other than the target collection region are disabled.

In some embodiments, the fingerprint identifier 30 may be further configured to: before acquiring the induction information of the operation body at the fingerprint collection region, divide the fingerprint collection region into P fingerprint collection sub-regions, where P is a positive integer greater than or equal to 2.

In some embodiments, the fingerprint identifier 30 may be connected to the sensors 20 corresponding to the P fingerprint collection sub-regions via the switches 40, respectively. That is, one switch 40 may be disposed between the fingerprint identifier 30 and one sensor 20. The switches 40 may control the sensors 20 corresponding to the P fingerprint collection sub-regions simultaneously.

In some embodiments, the fingerprint identifier 30 may be further configured to: switching the switches 40 to sensors 20 corresponding to the target collection region to enable the sensors 20 corresponding to the target collection region.

In some embodiments, the fingerprint identifier 30 may be further configured to, if only one of the P fingerprint collection sub-regions has induction information, determine the one fingerprint collection sub-region having the induction information as the target collection region. If two or more fingerprint collection sub-regions have the induction information, the fingerprint identifier 30 may determine a fingerprint collection sub-region having the strongest induction information as the target collection region.

As such, the identifying circuit identifies the fingerprint information collected from the target collection region, where the target collection region is a sub-region of the fingerprint collection region. Further, because each time only a portion of the fingerprint collection region is used as the target collection region, one identifying circuit may support a large-scale fingerprint collection region. In other words, one identifying circuit may perform fingerprint identification on a fingerprint collection region with a large area. Thus, the utilization rate of the identifying circuit may be improved. Further, because one identifying circuit can support and cover a large-scale fingerprint collection region, multiple identifying circuits are not needed for the large-scale fingerprint collection region, which saves the hardware cost.

The identifying circuit may be an integrated circuit, such as a chip or a microchip. Further, the identifying circuit may function as a processing unit such as a processor or microprocessor. The present disclosure is not limited to.

Those skilled in the relevant art shall understand that the functions of each processing module or component of the electronic device may be understood with reference to the description of the controlling method. Each processing module or component of the electronic device may be realized by the analog circuit that implements the aforementioned functions, or may be realized by executing software with aforementioned functions on an electronic device.

In practical application, the processor may be include, for example, a central processing unit (CPU), a micro-controller unit (MCU), a digital signal processor (DSP), or a programmable logic controller (PLC). The disclosed electronic device at least solves the issue that one single identifying circuit cannot support the large-scale fingerprint collection region, thereby improving the utilization rate of the identifying circuit.

Figure 10:
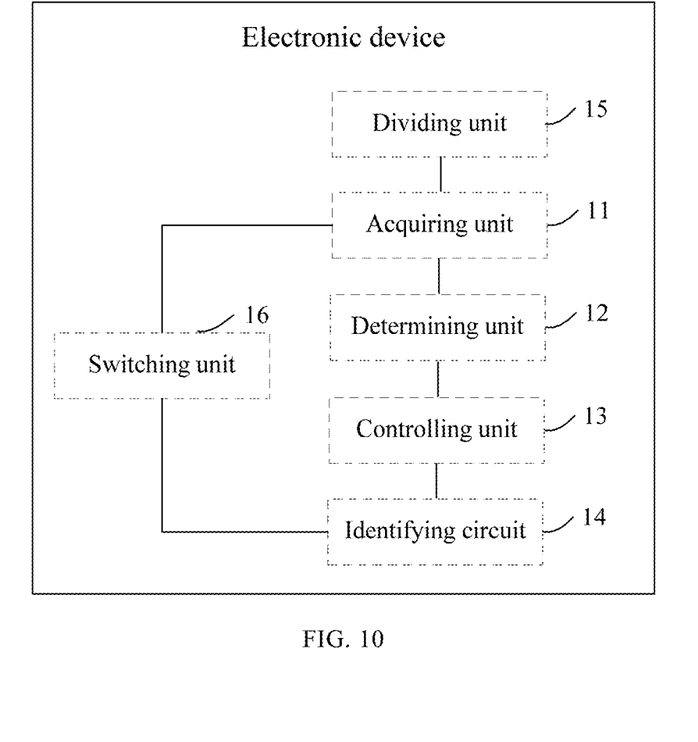
FIG. 10 illustrates a structural schematic view showing another example of an electronic device in accordance with some embodiments of the present disclosure.

FIG. 10 illustrates a structural schematic view showing another example of an electronic device in accordance with some embodiments of the present disclosure. The electronic device may include a display screen, and a plurality of sensors. The display screen may include a display output region. The plurality of sensor may form a fingerprint collection region, and the fingerprint collection region may overlap with the display output region. Referring to FIG. 10, the electronic device further includes an acquiring unit 11, a determining unit 12, a controlling unit 13, and an identifying circuit 14. In one example, the electronic device further includes a dividing unit 15. In another example, the electronic device further includes a switching unit 16.

The acquiring unit 11 may be configured to acquire induction information of an operation body at the fingerprint collection region. The determining unit 12 may be configured to, based on the induction information, determine a target collection region that collects fingerprint corresponding to the operation body. The target collection region belongs to the fingerprint collection region. That is, the target collection region is a sub-region of the fingerprint collection region.

The controlling unit 13 may be configured to enable sensors corresponding to the target collection region. The identifying circuit 14 may be configured to perform identification on the fingerprint information of the operation body acquired by the sensors 20 of the target collection region.

In some embodiments, the controlling unit 13 may be further configured to: disable the sensors corresponding to sub-regions of the fingerprint collection region other than the target collection region. That is, only the sensors corresponding to the target collection region are enabled, and sensors corresponding to sub-regions of the fingerprint collection region other than the target collection region are disabled.

The dividing unit 15 may be configured to, before acquiring the induction information of the operation body within the fingerprint collection region, divide the fingerprint collection region into P fingerprint collection sub-regions, where P is a positive integer greater than or equal to 2.

The switching unit 16 may include a plurality of switches, and the plurality of switches may correspond to channels of the identifying circuit 14, respectively. Each channel of the identifying circuit 14 may be connected to the P fingerprint collection sub-regions via a switch corresponding to the channel. For example, the identifying circuit 14 may be connected to the sensors corresponding to the P fingerprint collection sub-regions, respectively, via the switches. The switching unit 16 may control the sensors corresponding to the P fingerprint collection sub-regions.

In some embodiments, the switching unit 16 may be integrated to the identifying circuit 14. In some other embodiments, the switching unit 16 may be integrated into an individual device connected to the identifying circuit 14, and the individual device may be connected to the fingerprint collection sub-regions of the P fingerprint collection sub-regions.

In some embodiments, the controlling unit 13 may be further configured to switch the switching unit 16 to sensors corresponding to the target collection region to enable the sensors corresponding to the target collection region.

In some embodiments, the determining unit 12 may be further configured to, if only one of the P fingerprint collection sub-regions has induction information, determine the one fingerprint collection sub-region having the induction information as the target collection region. If two or more fingerprint collection sub-regions have the induction information, the determining unit 12 may determine a fingerprint collection sub-region having the strongest induction information as the target collection region.

The induction information may be configured to characterize fingerprint input by the operation body at a certain region of the fingerprint collection region. The induction information may be presented in various forms, for example, by a capacitance signal or a voltage signal.

Those skilled in the relevant art shall understand that the functions of each processing module or functional unit of the electronic device may be understood with reference to the description of the controlling method. Each processing module or functional unit of the electronic device may be realized by the analog circuit that implements the aforementioned functions, or may be realized by executing software with aforementioned functions on an electronic device.

In practical application, each of the acquiring unit 11, the determining unit 12, the controlling unit 13, and the dividing unit 15 may include, for example, a central processing unit (CPU), a micro-controller unit (MCU), a digital signal processor (DSP), or a programmable logic controller (PLC). The identifying circuit 14 may include a fingerprint identifier of the electronic device. The switching unit 16 may include a plurality of single-pole-n-throw (SPNT) switches. The disclosed electronic device at least solves the issue that one single identifying circuit cannot support the large-scale fingerprint collection region, thereby improving the utilization rate of the identifying circuit.

Figure 11:
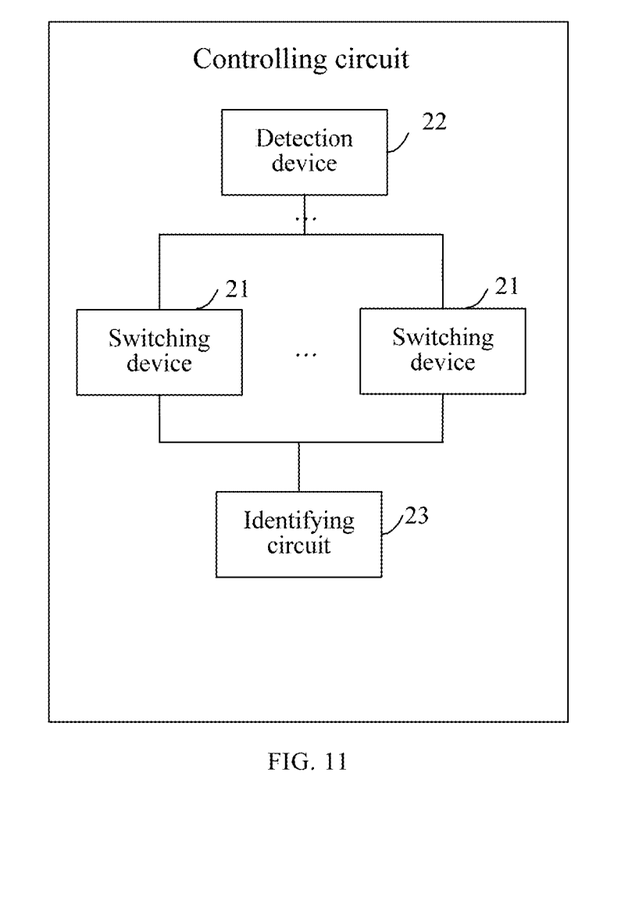
FIG. 11 illustrates a structural schematic view showing an example of a controlling circuit in accordance with some embodiments of the present disclosure.

The present disclosure further provides a controlling circuit. FIG. 11 illustrates a structural schematic view showing an example of a controlling circuit in accordance with some embodiments of the present disclosure. As shown in FIG. 11, the controlling circuit includes a plurality of switching devices 21, a detection device 22, and an identifying circuit 23. The plurality of switching devices 21 may correspond to channels of the identifying circuit 23, respectively, and each channel of the identifying circuit 23 may be connected to P fingerprint collection sub-regions via one switching device 21 corresponding to the channel, where P is a positive integer greater than or equal to 2.

The detection device 22 is configured to: when a triggering condition is satisfied, monitor induction information such as a capacitance signal or a force signal; and send the monitored induction information to the identifying circuit 23.

The identifying circuit 23 is configured to determine a target collection region out of the P fingerprint collection sub-regions based on the induction information. The identifying circuit 23 is further configured to control the switching device 21 to switch to connect to channels of the target collection region, thus allowing the identifying circuit 23 to identify fingerprint collected at the target collection region. The identifying circuit 23 may support fingerprint identification on any fingerprint collection sub-region out of the P fingerprint collection sub-regions.

In one embodiment, an $i^{th}$ Tx channel of the identifying circuit 23 may be connected with an $i^{th}$ Tx channel of each of the P fingerprint collection sub-regions through an $i^{th}$ switch, where $1 \leq i \leq n$ and n is the total number of Tx channels included in the identifying circuit 23. Further, a $j^{th}$ Rx channel of the identifying circuit 23 may be connected with a $j^{th}$ Rx channel of each of the P fingerprint collection sub-regions through a $i^{th}$ switch, where $1 \leq j \leq m$, and m is the total number of Rx channels included in the identifying circuit 23.

In some embodiments, the number of the switching devices 21 may be the same as the number of the channels of the identifying circuit 23. The switching device 21 may include a plurality of SPNT switches, the movable end of each SPNT switch may be connected to a Tx or Rx channel of the identifying circuit, and immovable ends of each SPNT switch may be respectively connected to a Tx or Rx channel of each of the P fingerprint collection sub-regions.

In practical applications, each switching device may be integrated into the identifying circuit. Or, the switching devices may be integrated to an individual device connected to the identifying circuit, and the individual device may be connected to the fingerprint collection sub-regions.

The present disclosure further provides a storage medium, and the storage medium stores computer programs. When being executed by the processor, the computer programs may realize one or more controlling method described above. The computer storage medium may be in various types, for example, the storage medium may be a non-transitory storage medium, i.e., a storage medium that is not a transitory signal.

Those skilled in the relevant art shall understand that the functions of each program stored in the storage medium may be understood with reference to the controlling method described above.

In various embodiments of the present disclosure, it should be understood that the disclosed method, device and apparatus may be implemented by other manners. For example, the device described above is merely for illustrative purposes. For example, the units may be merely partitioned by logic function. In practice, other partition manners may also be possible. For example, various units or components may be combined or integrated into another system, or some features may be omitted or left unexecuted. Further, mutual coupling or direct coupling or communication connection displayed or discussed therebetween may be via indirect coupling or communication connection of some communication ports, devices, or units, in electrical, mechanical or other manners.

Units described as separated components may or may not be physically separated, and the components serving as display units may or may not be physical units. That is, the components may be located at one position or may be distributed over various network units. Optionally, some or all of the units may be selected to realize the purpose of solutions of embodiments herein according to practical needs. Further, each functional unit in each embodiment of the present disclosure may be integrated in one processing unit, or each unit may exist physically and individually, or two or more units may be integrated in one unit.

When the described functions are implemented as software function units, and are sold or used as independent products, they may be stored in a computer accessible storage medium. Based on such understanding, the technical solutions of the present disclosure may be embodied in the form of a software product. The computer software product may be stored in a storage medium, and include several instructions to instruct a computer device (e.g., a personal computer, a server, or a network device) to execute all or some of the method steps of each embodiment. The storage medium described above may include portable storage device, ROM, RAM, a magnetic disc, an optical disc or any other media that may store program codes.

The foregoing is only specific implementation methods of the present disclosure, and the protection scope of the present disclosure is not limited thereto. Without departing from the technical scope of the present disclosure, variations or replacements obtainable by anyone skilled in the relevant art shall all fall within the scope of the present disclosure. The protection scope of the invention is therefore to be limited only by the appended claims.

What is claimed is:

1. A controlling method comprising:
acquiring induction information of an operation body at a fingerprint collection region, wherein the fingerprint collection region includes P fingerprint collection sub-regions, P being an integer greater than 1, and each of the P fingerprint collection sub-regions being formed by a corresponding sensor group;
based on the induction information, determining a target collection region for collecting fingerprint corresponding to the operation body, wherein the target collection region includes one of the P fingerprint collection sub-regions; and
switching switches to electrically connect sensors corresponding to the target collection region to an identifying circuit to perform identification on fingerprint information, wherein one of the switches is configured to control connection status between P channels of the fingerprint collection region and one corresponding channel of the identifying circuit, each of the P channels belonging to a different fingerprint collection sub-region.

2. The method according to claim 1, further comprising:
disabling sensors corresponding to a sub-region of the fingerprint collection region other than the target collection region.

3. The method according to claim 1, wherein determining, based on the induction information, the target collection region for collecting the fingerprint corresponding to the operation body includes:
in response to one of the plurality of fingerprint collection sub-regions acquiring the induction information, determining the one of the plurality of fingerprint collection sub-regions acquiring the induction information as the target collection region.

4. The method according to claim 1, wherein determining, based on the induction information, the target collection region for collecting the fingerprint corresponding to the operation body includes:
in response to two or more of the plurality of fingerprint collection sub-regions acquiring the induction information, determining one of the two or more of the plurality of fingerprint collection sub-regions acquiring strongest induction information as the target collection region.

5. The method according to claim 1, wherein acquiring the induction information of the operation body at the fingerprint collection region includes:
receiving an operation to input fingerprint at the fingerprint collection region;
acquiring data information characterizing property information of the operation; and
based on the data information, generating the induction information.

6. The method according to claim 1, wherein:
the induction information includes a capacitance signal, and
determining, based on the induction information, the target collection region for collecting the fingerprint corresponding to the operation body includes:
determining an area of the fingerprint collection region where the capacitance signal changes as the target collection region.

7. The method according to claim 1, wherein:
the induction information includes a force signal, and
determining, based on the induction information, the target collection region for collecting the fingerprint corresponding to the operation body includes:
determining an area of the fingerprint collection region where the force signal is generated as the target collection region.

8. An electronic device comprising:
a display screen including a display output region;
a plurality of sensors, wherein the plurality of sensors form a fingerprint collection region and the fingerprint collection region overlaps with the display output region, wherein the fingerprint collection region includes P fingerprint collection sub-regions, P being an integer greater than 1, and each of the P fingerprint collection sub-regions being formed by a corresponding sensor group;
a fingerprint identifier, wherein the fingerprint identifier is configured to:

acquire induction information of an operation body at the fingerprint collection region, based on the induction information, determines a target collection region for collecting fingerprint corresponding to the operation body, wherein the target collection region includes one of the P fingerprint collection sub-regions, and control switches to electrically connect sensors corresponding to the target collection region to an identifying circuit to perform identification on fingerprint information, wherein one of the switches is configured to control connection status between P channels of the fingerprint collection region and a corresponding channel of the identifying circuit, each of the P channels belonging to a different fingerprint collection sub-region.

9. The electronic device according to claim 8, wherein the fingerprint identifier is further configured to:

disable one or more of the sensors that correspond to a sub-region of the fingerprint collection region other than the target collection region.

10. The electronic device according to claim 8, wherein the fingerprint identifier is further configured to:

in response to one of the plurality of fingerprint collection sub-regions acquiring the induction information, determine one of the plurality of fingerprint collection sub-regions acquiring the induction information as the target collection region.

11. The electronic device according to claim 8, wherein the fingerprint identifier is further configured to:

in response to two or more of the plurality of fingerprint collection sub-regions acquiring the induction information, determine one of the two or more of the plurality of fingerprint collection sub-regions acquiring strongest induction information as the target collection region.

12. The electronic device according to claim 8, wherein the fingerprint identifier is further configured to:

receive an operation to input fingerprint at the fingerprint collection region;

acquire data information characterizing property information of the first operation; and based on the data information, generate the induction information.

13. The electronic device according to claim 8, wherein:
the induction information includes a capacitance signal, and the fingerprint identifier is configured to determine an area of the fingerprint collection region where the capacitance signal changes as the target collection region.

14. The electronic device according to claim 8, wherein:
the induction information includes a force signal, and
the fingerprint identifier is configured to determine an area of the fingerprint collection region where the force signal is generated as the target collection region.

15. The method according to claim 1, wherein switching the switches to electrically connect the sensors corresponding to the target collection region to the identifying circuit comprises:

switching the one of the switches to electrically connect a channel in the target collection region with the corresponding channel of the identifying circuit, and electrically disconnect one or more of the P channels outside the target collection region from the corresponding channel of the identifying circuit.

16. The method according to claim 1, wherein:
the fingerprint collection region includes P*N first channels, each of the P fingerprint collection sub-regions including N first channels, N being an integer greater than 1;

the identifying circuit includes N corresponding channels that respectively connected to N first switches; and an ith switch of the N first switches is configured to control connection status between an (i+(p−1)*N)th first channel of the fingerprint collection region and a corresponding ith channel in the identifying circuit, i being an integer between 1 and N, p being an integer between 1 and P, and the (i+(p−1)*N)th first channel being included in a pth fingerprint collection sub-region.

17. The method according to claim 16, wherein:
the fingerprint collection region includes M second channels, the M second channels being arranged perpendicular to the P*N first channels, and M being an integer greater than 1; and the M second channels are connected to the identifying circuit through second switches.

18. The method according to claim 1, wherein:
the P channels are arranged in parallel to each other.

19. The electronic device according to claim 8, wherein the fingerprint identifier is further configured to:

switch the one of the switches to electrically connect a channel in the target collection region with the corresponding channel of the identifying circuit, and electrically disconnect one or more of the P channels outside the target collection region from the corresponding channel of the identifying circuit.

20. The electronic device according to claim 8, wherein:
the fingerprint collection region includes P*N first channels arranged adjacent to each other, each of the P fingerprint collection sub-regions including N first channels, N being an integer greater than 1;

the identifying circuit includes N corresponding channels that respectively connected to N first switches; and an ith switch of the N first switches is configured to control connection status between an (i+(p−1)*N)th first channel of the fingerprint collection region and a corresponding ith channel in the identifying circuit, i being an integer between 1 and N, p being an integer between 1 and P, and the (i+(p−1)*N)th first channel being included in a pth fingerprint collection sub-region.

* * * * *